United States Patent
Ito et al.

(10) Patent No.: US 7,960,955 B2
(45) Date of Patent: Jun. 14, 2011

(54) POWER SUPPLY DEVICE, ELECTRONIC DEVICE USING THE SAME, AND SEMICONDUCTOR DEVICE

(75) Inventors: Tomoyuki Ito, Kyoto (JP); Yoichi Tamegai, Kyoto (JP); Koki Tamakawa, Kyoto (JP); Isao Yamamoto, Kyoto (JP)

(73) Assignee: Rohm Co., Ltd. (JP)

( * ) Notice: Subject to any disclaimer, the term of this patent is extended or adjusted under 35 U.S.C. 154(b) by 358 days.

(21) Appl. No.: 12/096,765

(22) PCT Filed: Nov. 30, 2006

(86) PCT No.: PCT/JP2006/324029
§ 371 (c)(1),
(2), (4) Date: Jun. 9, 2008

(87) PCT Pub. No.: WO2007/066583
PCT Pub. Date: Jun. 14, 2007

(65) Prior Publication Data
US 2009/0273327 A1    Nov. 5, 2009

(30) Foreign Application Priority Data
Dec. 9, 2005  (JP) .................................. 2005-356077

(51) Int. Cl.
*G05F 1/40*    (2006.01)
(52) U.S. Cl. ........................ 323/281; 323/273
(58) Field of Classification Search .................. 323/268, 323/270, 271, 273, 275, 280, 281
See application file for complete search history.

(56) References Cited

U.S. PATENT DOCUMENTS

| | | | | |
|---|---|---|---|---|
| 6,130,529 | A  * | 10/2000 | Andres et al. | 323/303 |
| 6,275,017 | B1 * | 8/2001 | Germanski et al. | 323/273 |
| 2009/0072626 | A1 * | 3/2009 | Watanabe et al. | 307/85 |

FOREIGN PATENT DOCUMENTS

| | | |
|---|---|---|
| JP | 5-35344 | 2/1993 |
| JP | 2002-315335 | 10/2002 |
| JP | 2004-32899 | 1/2004 |
| JP | 2004-201474 | 7/2004 |

(Continued)

OTHER PUBLICATIONS

Chinese Office Action for Application No. 20060013756.3 issued Jun. 26, 2009 with English translation.

(Continued)

*Primary Examiner* — Matthew V Nguyen
(74) *Attorney, Agent, or Firm* — Cantor Colburn LLP

(57) ABSTRACT

A linear regulator is provided which stabilizes an input voltage based on a reference voltage source that generates a reference voltage, and the reference voltage generated by the reference voltage. An output voltage of the linear regulator is supplied as a power supply voltage of a switching controller and the reference voltage source. The linear regulator is configured to enable switching of a regulation mode in which voltage is outputted according to the reference voltage, and a bypass mode in which an input voltage is outputted as it is, with no relation to the reference voltage. When a power supply apparatus is started up, during a time period until the input voltage reaches a predetermined threshold voltage, the linear regulator operates in the bypass mode, and when the input voltage exceeds the threshold voltage, operates in the regulation mode.

11 Claims, 5 Drawing Sheets

FOREIGN PATENT DOCUMENTS

JP          2005-73483          3/2005

OTHER PUBLICATIONS

International Preliminary Report on Patentability for International Patent Application No. PCT/JP2006/324029 issued Jun. 11, 2008 with English Translation.

International Search Report for International Application No. PCT/JP2006/324029 mailed Mar. 6, 2007 with English Translation.

Japanes Office Action for Japanese Patent Application No. 2005-356077 dispatched Sep. 28, 2010 with English translation.

* cited by examiner

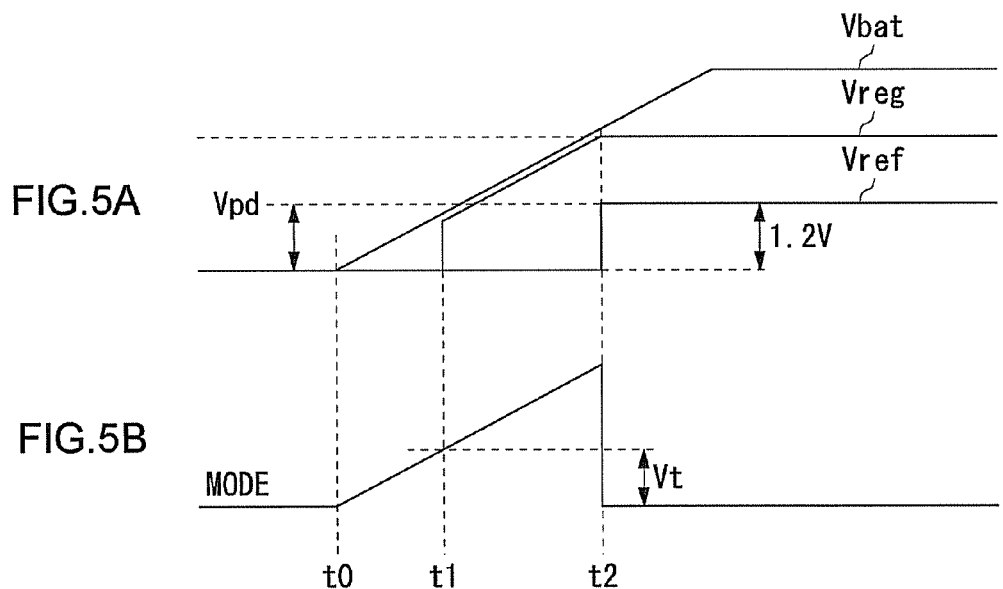
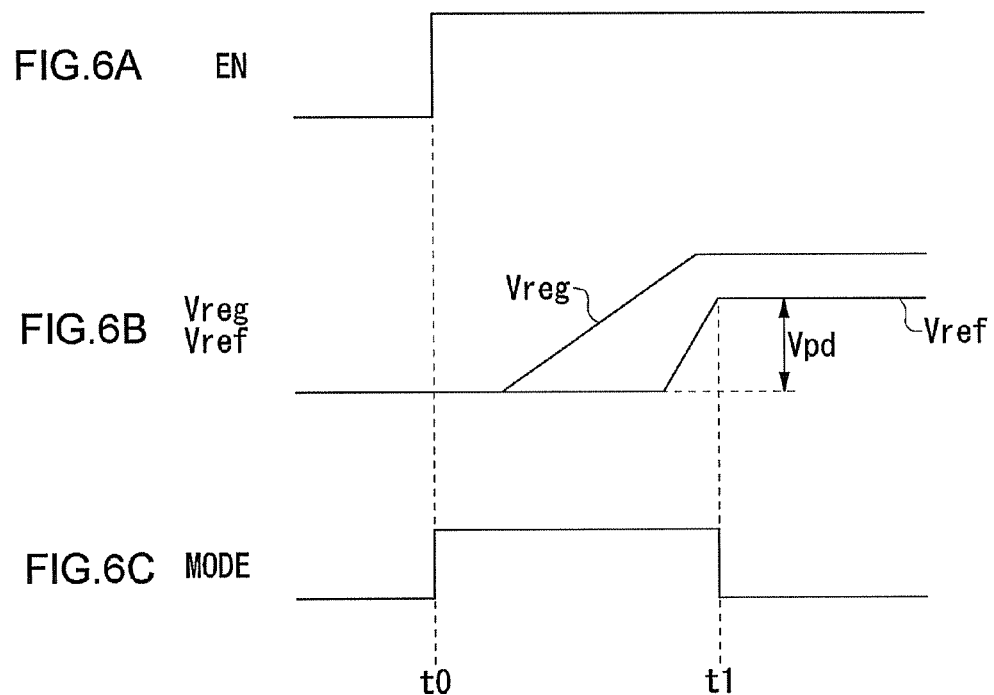

POWER SUPPLY DEVICE, ELECTRONIC DEVICE USING THE SAME, AND SEMICONDUCTOR DEVICE

CROSS REFERENCE TO RELATED APPLICATIONS

This is a U.S. national stage of application No. PCT/JP2006/324029, filed on 30 Nov. 2006. Priority under 35 U.S.C. §119(a) and 35 U.S.C. §365(b) is claimed from Japanese Application No. 2005-356077, filed 9 Dec. 2005, the disclosure of which is also incorporated herein by reference.

BACKGROUND OF THE INVENTION

1. Field of the Invention

The present invention relates to power supply apparatuses, and in particular to technology for generating stable voltage that is not affected by noise.

2. Description of the Related Art

In various kinds of electronic devices, in order to supply a voltage higher or a voltage lower than a power supply voltage supplied from a battery or the like, to a load circuit, a step-up or a step-down switching power supply is used. For example, Patent Documents 1 and 2 disclose an insulating DC/DC converter as a switching power supply.

This type of switching power supply is configured to have a switching element for controlling current flowing in an inductor or a transformer. In this switching power supply, switching noise is generated from the switching element which turns ON and OFF at a high frequency during a stepping up or stepping down operation.

Patent Document 1: 2004-201474
Patent Document 2: 2005-73483

A switching power supply is provided with a control circuit which controls ON and OFF states of a switching element. This control circuit turns ON and OFF the switching element, based on a reference voltage outputted from a reference voltage source such as a bandgap reference circuit or the like, and stabilizes output voltage of the switching power supply.

Here, switching noise generated by the switching element has an impact on another circuit block connected via power supply wiring or the like. When the switching noise is inputted to the reference voltage source, since the noise is superimposed on the reference voltage, there is a risk that a stepping up or a stepping down operation will be hindered.

SUMMARY OF THE INVENTION

The present invention has been made in light of these problems, and a general purpose thereof is to provide a power supply apparatus which can generate a stabilized voltage without being affected by the noise, and a semiconductor device.

The power supply apparatus of an embodiment of the present invention is provided with a switching power supply which stabilizes an input voltage provided from outside, a reference voltage source which generates a predetermined reference voltage, and a linear regulator which stabilizes the input voltage, based on the reference voltage generated by the reference voltage source. An output voltage of the linear regulator is supplied as a power supply voltage of a control circuit of the switching power supply and the reference voltage source.

According to the embodiment, since the reference voltage source generates the reference voltage, with the output voltage of the linear regulator as the power supply voltage, an impact of noise generated in the switching element can be reduced, and it is possible to generate the reference voltage with a small noise component.

The linear regulator may be configured to enable switching of a regulation mode in which voltage is outputted according to the reference voltage, and a bypass mode in which input voltage is outputted as it is, with no relation to the reference voltage. When the present power supply apparatus is started up, the linear regulator may operate in the bypass mode, during a time period until the reference voltage reaches a predetermined voltage value, and when the reference voltage exceeds the predetermined voltage value, may operate in the regulation mode.

In such cases, at the startup time, since the input voltage from the linear regulator is outputted as it is, when the reference voltage is lower than a threshold voltage, the input voltage is supplied as it is, to the reference voltage source. When the voltage supplied to the reference voltage source increases, the reference voltage source starts normal operation, and the reference voltage rises and exceeds a predetermined voltage value. When the reference voltage exceeds the predetermined voltage value, since the linear regulator operates in the regulation mode, a voltage that is stabilized by the linear regulator is supplied as the power supply voltage to the reference voltage source. As a result, the present power supply apparatus including the reference voltage source is started up in a preferred manner.

The linear regulator may have a configuration provided with an operational amplifier to which are inputted the reference voltage and a feedback voltage corresponding to the output voltage of the linear regulator; a transistor in which an error voltage outputted from the operational amplifier is inputted to a control terminal, and which outputs the output voltage from another end; and a switch circuit which changes electrical potential of the control terminal of the transistor, in the bypass mode, and forcibly turns the transistor ON. The switch circuit may include a switch arranged between a terminal with a fixed electrical potential and the control terminal of the transistor, which is ON in the bypass mode.

When in the bypass mode, by turning the transistor fully ON using the switch circuit, it is possible to output the input voltage from the linear regulator, as it is.

When the reference voltage generated by the reference voltage source reaches a predetermined voltage value, the reference voltage source may output a mode control signal at a predetermined level, and when the mode control signal outputted from the reference voltage source reaches a predetermined level, the linear regulator may transition to the regulation mode. The reference voltage source may generate the mode control signal based on current flowing in the transistor that is ON when the reference voltage reaches the predetermined voltage value.

In such cases, before the reference voltage reaches the predetermined value, the linear regulator goes into the bypass mode and outputs the input voltage as it is, and after the predetermined value has been reached, transitions to the regulation mode, so that the input voltage can be stabilized based on the reference voltage that has been stabilized.

The reference voltage source, the linear regulator, and the control circuit of the switching power supply may be integrated on one semiconductor substrate. "Integrated" includes cases in which all component elements of the circuit are formed on the semiconductor substrate, and cases in which main component elements of the circuit are integrated, and some resistors, capacitors, or the like, for adjusting a circuit constant, may be arranged outside the semiconductor substrate.

The switching power supply may be a step-up switching regulator which steps up the input voltage. In such cases, the noise generated in the switching element runs into the reference voltage source, via an inductor or a transformer, but the reference voltage source curtails the impact of this noise, and it is possible to generate the stabilized reference voltage.

Another embodiment of the present invention is an electronic device. The electronic device is provided with a battery, a load circuit, and the abovementioned power supply apparatus which has voltage of the battery as an input voltage, and which steps up this voltage to supply the load circuit. This electronic device may be further provided with an imaging unit. Furthermore, the load circuit may include a xenon tube which operates as a flash when an image is taken by the imaging unit.

Another embodiment of the present invention relates to a semiconductor device. The semiconductor device is provided with a reference voltage source which generates a predetermined reference voltage, and a linear regulator which stabilizes input voltage, based on the reference voltage generated by the reference voltage source. The semiconductor device supplies an output voltage of the linear regulator as a power supply voltage of the reference voltage source.

In the semiconductor device of this embodiment also, the linear regulator may be configured to enable switching of a regulation mode in which a voltage is outputted according to the reference voltage, and a bypass mode in which the input voltage is outputted as it is, with no relation to the reference voltage. When the present semiconductor device is started up, the linear regulator may operate in the bypass mode, during a time period until the input voltage reaches a predetermined threshold voltage, and when the input voltage exceeds the threshold voltage, may operate in the regulation mode.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 5A and 5B are time charts of the power supply apparatus of FIG. 1 at startup time and during stable operation; and FIGS. 6A to 6C are time charts of the power supply apparatus of FIG. 1 at startup time and during stable operation.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
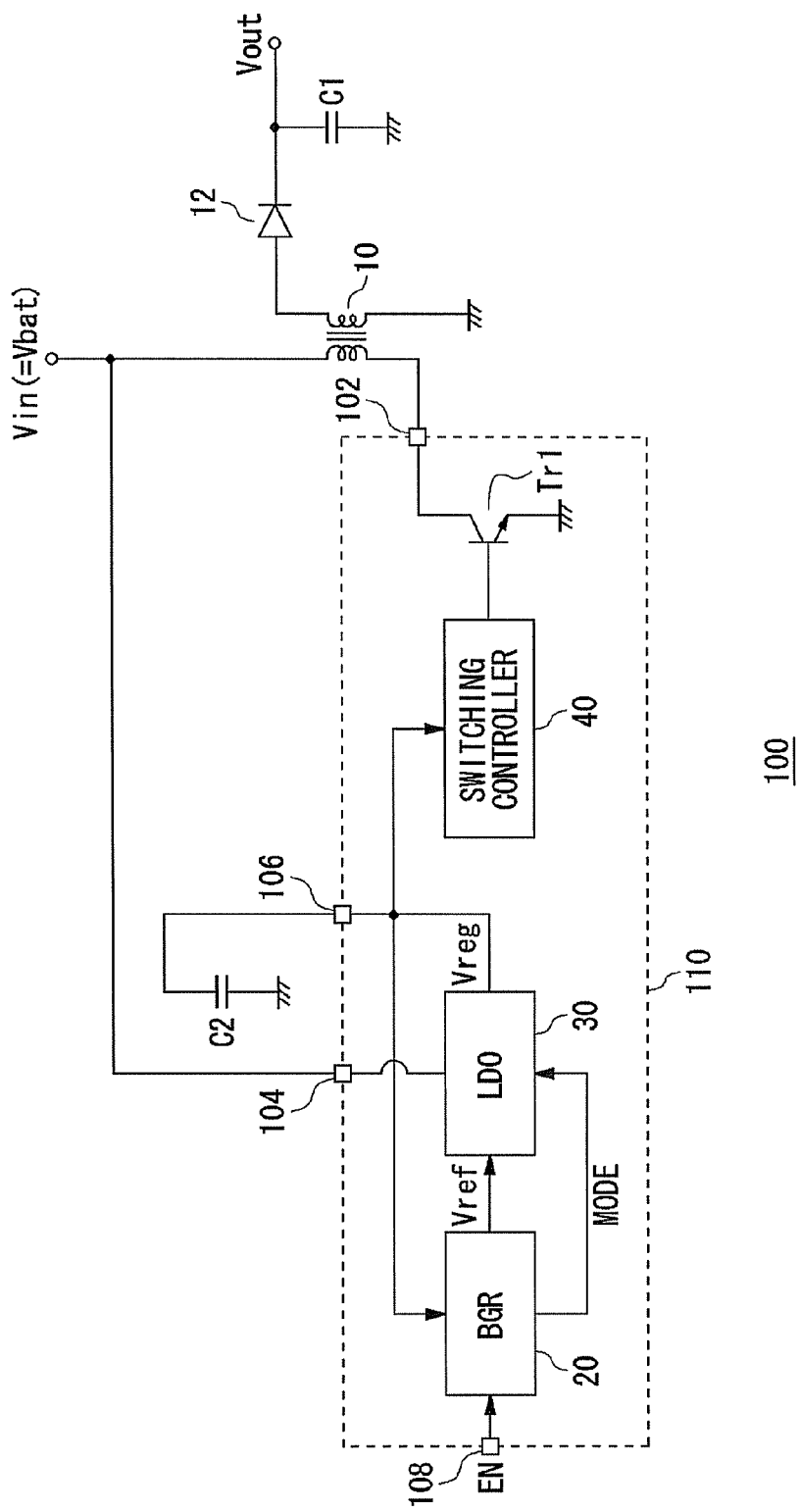
FIG. 1 is a block diagram showing a configuration of a power supply apparatus according to an embodiment.
Figure 2:
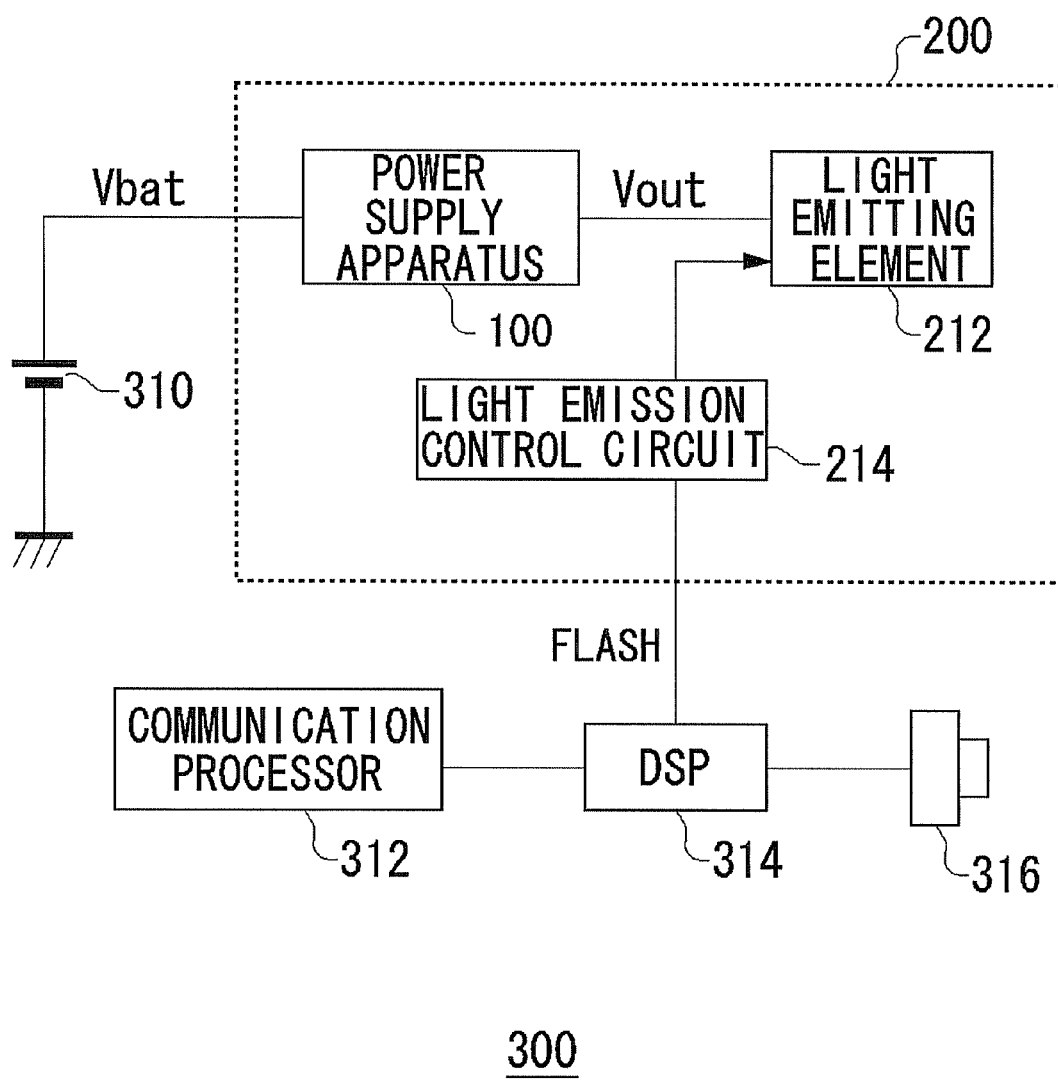
FIG. 2 is a block diagram showing a configuration of an electronic device in which the power supply apparatus of FIG. 1 is installed.

FIG. 1 is a block diagram showing a configuration of a power supply apparatus 100 according to an embodiment. FIG. 2 is a block diagram showing a configuration of an electronic device 300 in which the power supply apparatus 100 of FIG. 1 is installed. The electronic device 300 is a mobile telephone in which a camera is installed, and is provided with a battery 310, a communication processor 312, a DSP (Digital Signal Processor) 314, an imaging unit 316, and a light emitting device 200.

The battery 310 is, for example, a lithium-ion battery, and is provided as a power supply of the electronic device 300. The battery 310 outputs a voltage of about 3 to 4 V as a battery voltage Vbat. The DSP 314 is a block which performs overall control of the entire electronic device 300, and is connected to the communication processor 312, the imaging unit 316, and the light emitting device 200. The communication processor 312 includes an antenna, a high frequency circuit, and the like, and is a block which performs communication with a base station. The imaging unit 316 is an imaging device such as a CCD (Charge Coupled Device), a CMOS sensor, or the like. The light emitting device 200 is a light source used as a flash, when taking an image with the imaging unit 316.

The light emitting device 200 is provided with a power supply apparatus 100, a light emitting element 212, and a light emission control circuit 214. A xenon tube or the like is used as the light emitting element 212. The power supply apparatus 100 is a switching regulator, and steps up the battery voltage Vbat supplied from the battery 310, to supply a driving voltage Vout of about 300 V to the light emitting element 212. The light emission control circuit 214 controls timing of light emission of the light emitting device 200.

The DSP 314 outputs a flash signal FLASH to the light emission control circuit 214 in synchronization with timing of taking of an image by a user. When the flash signal FLASH is inputted to the light emission control circuit 214, the light emitting element 212 is made to emit light.

Returning to FIG. 1, an explanation will be given concerning the power supply apparatus 100 which steps up the battery voltage Vbat. The power supply apparatus 100 includes a control circuit 110, a transformer 10, a rectifier diode 12, an output capacitor C1, and a bypass capacitor C2.

In FIG. 1, a switching controller 40 and a switching transistor Tr1 of the power supply apparatus 100, and the transformer 10, which is external, the rectifier diode 12, and the output capacitor C1 form a switching power supply. The battery voltage Vbat is applied as an input voltage Vin to a first terminal of a primary coil of the transformer 10. A second terminal of the primary coil is connected to a switching terminal 102 of the control circuit 110. Furthermore, an anode of the rectifier diode 12 is connected to a first terminal of a secondary coil of the transformer 10, and the output capacitor C1 is connected between a cathode of the rectifier diode 12 and a ground terminal. A second terminal of the secondary coil of the transformer 10 is grounded.

Next, an explanation will be given concerning a configuration of the control circuit 110. The control circuit 110 includes a reference voltage source 20 and a linear regulator 30, in addition to the switching transistor Tr1 and the switching controller 40, and is a function IC integrated on one semiconductor substrate.

The switching transistor Tr1 is an NPN bipolar transistor; a collector of the switching transistor Tr1 is connected to the primary coil of the transformer 10 via the switching terminal 102; and an emitter is grounded. The switching transistor Tr1 may be configured as a MOSFET.

The switching controller 40 controls base voltage of the switching transistor Tr1, and controls ON and OFF states thereof. By the switching transistor Tr1 repeatedly turning ON and OFF, a current flows alternately in the primary and secondary coils of the transformer 10, and the output capacitor C1 is charged. An output voltage Vout, obtained by stepping up the input voltage Vin provided from outside, is outputted from the output capacitor C1.

The reference voltage source 20 is a bandgap reference circuit, and generates a predetermined reference voltage Vref. An enabling signal EN inputted from outside to the reference voltage source 20 may be inputted via an enabling terminal 108. The enabling signal EN goes to a high level when the power supply apparatus 100 starts up. When the enabling signal EN has a high level, the reference voltage source 20 is ON, and generates the predetermined reference voltage Vref.

The battery voltage Vbat, which is the input voltage, is inputted via a power supply terminal 104, to the linear regulator 30. The linear regulator 30 stabilizes the battery voltage Vbat, which is the input voltage, based on the reference voltage Vref generated by the reference voltage source 20, and outputs the voltage thus stabilized. An output terminal of the linear regulator 30 is grounded via the bypass capacitor C2 connected to a terminal 106.

As described later, the linear regulator 30 is configured to enable switching of a regulation mode in which voltage is outputted according to the reference voltage Vref outputted from the reference voltage source 20, and a bypass mode which outputs the battery voltage Vbat as it is, with no relation to the reference voltage Vref. The two modes of the linear regulator 30 are switched by a mode control signal MODE outputted from the reference voltage source 20.

In the control circuit 110, an output voltage Vreg of the linear regulator 30 is supplied as a power supply voltage of the reference voltage source 20 and the switching controller 40 of the switching power supply.

Figure 3:
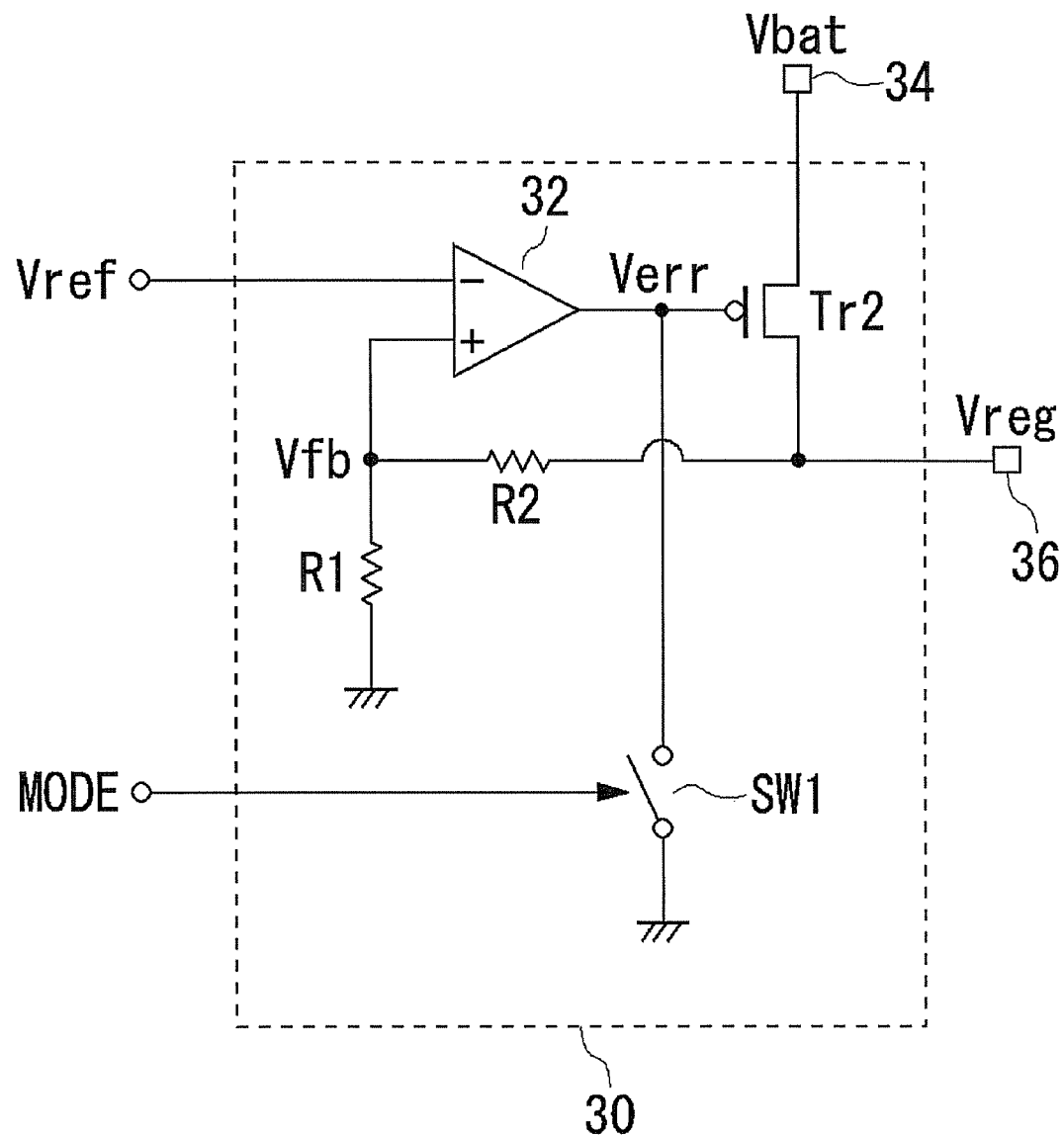
FIG. 3 is a circuit diagram showing a configuration of a linear regulator of FIG. 1.

FIG. 3 is a circuit diagram showing a configuration of the linear regulator 30 according to the embodiment. The linear regulator 30 includes a transistor Tr2, an operational amplifier 32, a first resistor R1, a second resistor R2, and a switch SW1.

The transistor Tr2 is a P-channel MOSFET, and a source thereof is connected to an input terminal 34 to which the battery voltage Vbat is applied. The input terminal 34 of the linear regulator 30 is connected to the power supply terminal 104 of the control circuit 110. The reference voltage Vref outputted from the reference voltage source 20 is inputted to an inverting input terminal of the operational amplifier 32, and an output terminal thereof is connected to a gate, which is a control terminal of the transistor Tr2. A drain of the transistor Tr2 corresponds to an output terminal 36 of the linear regulator 30; the output voltage Vreg that occurs at the output terminal 36 is divided by the first resistor R1 and the second resistor R2, and is fed back to a noninverting input terminal of the operational amplifier 32. The voltage fed back to the noninverting input terminal of the operational amplifier 32 is given by Vout×R1/(R1+R2), and this voltage is referred to as a feedback voltage Vfb. Moreover, the output terminal 36 is connected to the terminal 106 of the control circuit 110.

The switch SW1 is arranged between the gate of the transistor Tr2 and a ground potential terminal. The switch SW1 is ON in the bypass mode, and is OFF in the regulation mode. In the bypass mode, when the switch SW1 is ON, since the gate of the transistor Tr2 is forcibly lowered to close to ground potential, the transistor Tr2 is forcibly turned fully ON.

In the bypass mode, when the transistor Tr2 is fully ON, the difference in electrical potential between drain and source becomes very small. As a result, the input voltage Vbat, as the output voltage Vreg, is outputted as it is, from the linear regulator 30.

On the other hand, in the regulation mode in which the switch SW1 is OFF, gate potential of the transistor Tr2 is controlled by the operational amplifier 32. In the regulation mode, the operational amplifier 32 adjusts an error voltage Verr, which is an output thereof, that is, the gate potential of the transistor Tr2, so that the reference voltage Vref and the feedback voltage Vfb match. As a result, the output voltage Vreg of the linear regulator 30 is stabilized to a voltage value given by Vref×(1+R2/R1).

At startup time of the power supply apparatus 100, the linear regulator 30 operates in the bypass mode, in a time period until the reference voltage Vref reaches a predetermined voltage value Vpd, and when the reference voltage Vref exceeds the predetermined voltage value Vpd, operates in the regulation mode. The predetermined voltage value Vpd, which is to be compared to the reference voltage Vref, is desirably set to be close to a target value (normally about 1.2 V) of the reference voltage Vref. ON and OFF states of the switch SW1 are controlled by a mode control signal MODE outputted from the reference voltage source 20. When the mode control signal MODE is at a high level, the switch SW1 is ON and the linear regulator 30 is set to the bypass mode, and when at a low level, the switch SW1 is OFF and the linear regulator 30 is set to the regulation mode.

Figure 4:
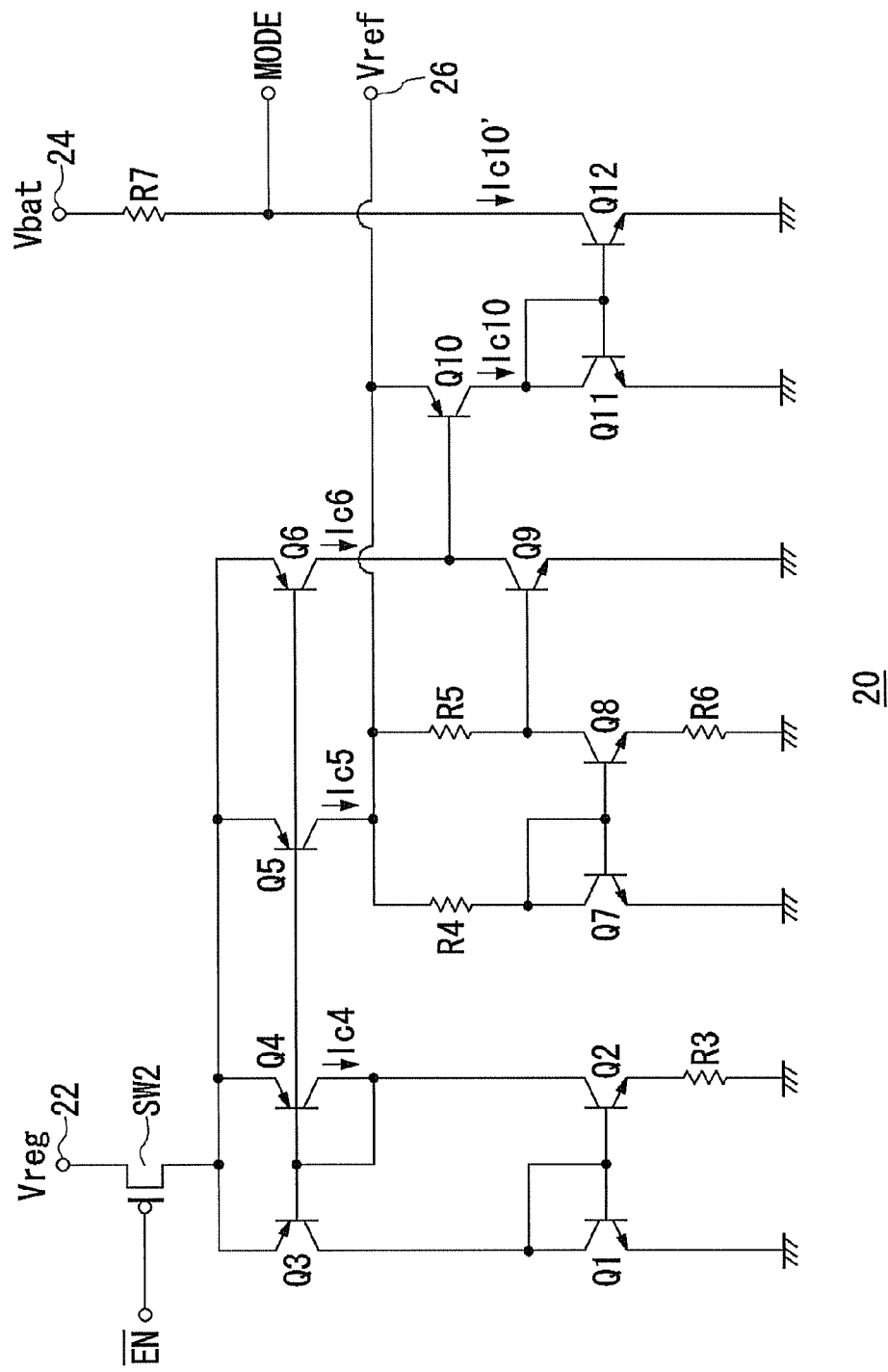
FIG. 4 is a circuit diagram showing a configuration of a reference voltage source of FIG. 1.

FIG. 4 is a circuit diagram showing a configuration of the reference voltage source 20 according to the present embodiment. The reference voltage source 20 is provided with transistors Q1 to Q12, resistors R3 to R7, and a switch SW2. The transistors Q1, Q2, Q7, Q8, Q9, Q11, and Q12 are NPN bipolar transistors, and the transistors Q3, Q4, Q5, Q6, and Q10 are PNP bipolar transistors. The output voltage Vreg of the linear regulator 30 is inputted to a terminal 22, and the battery voltage Vbat is applied to a terminal 24. The reference voltage source 20 outputs the reference voltage Vref at about 1.2 V, which is a target voltage, from an output terminal 26.

The transistors Q1 to Q4 and the resistor R3 form a general bias current source that uses a thermal voltage. That is, transistor pairs, the transistor Q1 and the transistor Q2, and the transistor Q3 and the transistor Q4 respectively form current mirror circuits. A collector of the transistor Q1 and a collector of the transistor Q3 are mutually connected, and collectors of the transistor Q2 and the transistor Q4 are mutually connected. The resistor R3 is arranged between an emitter of the transistor Q2 and ground. This type of circuit configuration is known as a self-bias circuit, and a constant current Ic4 flows in the transistor Q4.

The switch SW2 is arranged between an emitter of the transistors Q3 and Q4, and a terminal 22 to which the output voltage Vreg of the linear regulator 30 is applied. The switch SW2 is a P-channel MOSFET, and an enabling signal EN from an external circuit, not shown in the figure, is inputted to a gate. When the switch SW2 is ON, the reference voltage source 20 is ON, and the reference voltage Vref is generated. When the switch SW2 is OFF, a current path of the circuit is shut off, and the reference voltage source 20 is OFF. The switch SW2 is arranged to provide low power, and if unnecessary may be omitted.

The transistors Q4, Q5, and Q6 form a current mirror, and the transistors Q5 and Q6 generate a current according to the constant current Ic4 flowing in the transistor Q4. An emitter of the transistor Q7 is grounded. A resistor R4 is arranged between a collector of the transistor Q7 and a collector of the transistor Q5. Furthermore, a base and a collector of the transistor Q7 are connected to a base of the transistor Q8. A resistor R6 is arranged between an emitter of the transistor Q8 and ground, and a resistor R5 is arranged between a collector thereof and a collector of the transistor Q5. The collector terminal of the transistor Q5 is an output terminal 26 of the reference voltage source 20, and the reference voltage Vref occurs.

The base of the transistor Q9 is connected to a collector of the transistor Q8; an emitter thereof is grounded; and a collector thereof is connected to a collector of the transistor Q6.

The transistors Q10, Q11, Q12, and the resistor R7 are provided in order to generate the mode control signal MODE. A base of the transistor Q10 is connected to a collector of the transistor Q9, and an emitter is connected to a collector of the transistor Q11. Furthermore, an emitter of the transistor Q10 is connected to the output terminal 26. The transistor Q11 and the transistor Q12 form a current mirror circuit to which bases and emitters are commonly connected. The resistor R7 is arranged between the collector of the transistor Q12 and the terminal 24 to which the battery voltage Vbat is applied. In the present embodiment, the transistor Q10 is equivalent to a transistor which turns ON when the reference voltage Vref reaches a predetermined voltage value Vpd ($\approx$1.2 V).

The reference voltage source 20 configured as above operates normally as a bandgap reference circuit when the output voltage Vreg of the linear regulator 30 becomes higher than a predetermined level Vth, and outputs the reference voltage Vref at about 1.2 V.

Furthermore, with regard to the reference voltage source 20, when the output voltage Vreg of the linear regulator 30 becomes higher than a predetermined level, and the reference voltage Vref reaches the predetermined voltage value Vpd, the transistor Q10 is ON, and a current Ic10 flows. At this time, the transistors Q11 and Q12 that form the current mirror circuit generate a current Ic10' according to the current Ic10 flowing in the transistor Q10. When the current Ic10' flows in the resistor R7, since a voltage drop occurs, the mode control signal MODE goes to a low level.

When the output voltage Vreg of the linear regulator 30 is lower than a predetermined level, or the reference voltage source 20 is in an OFF state, since the transistor Q10 is OFF, the current Ic10 does not flow. Therefore, at this time, since a voltage drop does not occur across the resistor R7, the mode control signal MODE becomes equal to the battery voltage Vbat, and has a high level.

In this way, when the reference voltage Vref generated by the reference voltage source 20 reaches the predetermined voltage value Vpd, the reference voltage source 20 outputs the mode control signal MODE at a predetermined level (low level). Furthermore, as described above, this mode control signal MODE is outputted to the linear regulator 30. Therefore, when the mode control signal MODE outputted from the reference voltage source 20 has the predetermined level (low level), that is, the reference voltage Vref has a predetermined value, the linear regulator 30 transitions to the regulation mode.

An explanation will be given concerning operations of the power supply apparatus 100 configured as above. FIGS. 5A and 5B are time charts of the power supply apparatus 100 according to the present embodiment at startup time and during stable operation. FIG. 5A shows the battery voltage Vbat, the output voltage Vreg of the linear regulator 30, and the reference voltage Vref that is the output of the reference voltage source 20. In addition, FIG. 5B shows a mode control signal MODE. In FIGS. 5A and 5B, and in FIGS. 6A to 6C described later, in order to make the explanation clear, vertical axes and horizontal axes are shown as enlarged or contracted as appropriate. Furthermore, in order to simply explanations concerning each voltage waveform, there are cases in which actual voltage waveforms differ from those shown.

At time t0, the electronic device 300, in which the power supply apparatus 100 is installed, is ON, and the battery voltage Vbat increases with time. Immediately after startup, the mode control signal MODE has a low level, and the linear regulator 30 is in the regulation mode, but since the operational amplifier 32 is OFF and the reference voltage Vref is 0 V, the output voltage thereof Vreg is 0 V.

In the time period from time t0 to t1, the current Ic10' of the reference voltage source 20 does not flow, and since a voltage drop does not occur across the resistor R7, the mode control signal MODE is almost equal to the battery voltage Vbat and increases with time. At time t1, when the voltage value of the mode control signal MODE becomes larger than a voltage Vt at which the switch SW1 of the linear regulator 30 is ON, that is, has a high level, a bypass mode occurs and Vbat$\approx$Vreg.

After time t1, the output voltage Vreg, approximately equal to the battery voltage Vbat, from the linear regulator 30 is applied to the terminal 22 of the reference voltage source 20. Furthermore, the voltage value of the mode control voltage MODE rises together with the battery voltage Vbat. When the output voltage Vreg (=Vbat) of the linear regulator 30 applied to the terminal 22 of the reference voltage source 20 reaches the predetermined level Vth, the reference voltage source 20 is in an ON state, and the reference voltage Vref is stabilized at a predetermined value (=1.2 V). When the reference voltage source 20 is in an ON state, the transistor Q10 is ON, and the mode control signal MODE has a low level.

At time t2, when the mode control signal MODE goes to a low level, since the switch SW1 is OFF, the linear regulator 30 transitions to the regulation mode. After time t2, the output voltage Vreg of the linear regulator 30 is stabilized at a voltage value given by Vref$\times$(1+R2/R1).

FIGS. 6A to 6C are time charts of the power supply apparatus 100 according to the present embodiment at startup time and during stable operation, and are time charts for cases in which the battery voltage Vbat is assumed to be constant.

At time t0, the enabling signal EN goes to a high level and the switch SW2 is ON. Immediately after startup, the mode control signal MODE goes to a high level, and the reference voltage source 20 operates in bypass mode. When the linear regulator 30 operates in bypass mode, the transistor Tr2 is fully ON, a current flows from the battery to the bypass capacitor C2 via the transistor Tr2, and with a certain time constant, the output voltage Vreg of the linear regulator 30 increases.

With the increase of the output voltage Vreg of the linear regulator 30, the reference voltage source 20 begins operation. As a result, at time t1 the reference voltage Vref reaches the predetermined voltage value Vpd, and the mode control signal MODE transitions from a high level to a low level. After time t1, the linear regulator 30 transitions to the regulation mode, and performs voltage generation based on the reference voltage Vref.

According to the power supply apparatus 100 according to the present embodiment, the reference voltage source 20, which generates the reference voltage Vref, is power-supplied by the output voltage Vreg of the linear regulator 30 which stabilizes voltage based on the reference voltage Vref. As a result, even in cases in which switching noise that is generated in the switching regulator is superimposed on the battery voltage Vbat, it is possible to generate a stabilized reference voltage Vref with a small noise component, and in addition, it is possible to also stabilize the output voltage Vreg of the linear regulator 30.

Furthermore, in the power supply apparatus 100 of the present embodiment, the linear regulator 30 is configured to enable switching of the regulation mode and the bypass mode. In addition, in a time period until the reference voltage Vref generated by the reference voltage source 20 reaches the predetermined voltage value Vpd, the linear regulator 30 operates in the bypass mode, and when the reference voltage Vref exceeds the predetermined voltage value Vpd, operates in the regulation mode. In this way, at startup time, when the reference voltage Vref is lower than the predetermined voltage value Vpd, since the linear regulator 30 outputs the battery voltage Vbat as it is, the battery voltage Vbat is supplied to the reference voltage source 20. When the reference voltage Vref exceeds the predetermined voltage value Vpd, the voltage Vreg, stabilized by the linear regulator 30 as a power supply voltage, is supplied to the reference voltage source 20. As a result, the power supply apparatus 100 including the reference voltage source 20 can be started up preferably.

Furthermore, in the linear regulator 30, by providing the switch SW1, and turning the transistor Tr2 fully ON using a switch circuit, at bypass mode time, it is possible to output the battery voltage Vbat, which is the input voltage, as it is, from the linear regulator 30.

Furthermore, in the present embodiment, when the reference voltage Vref generated by the reference voltage source 20 reaches the predetermined voltage value Vpd, the reference voltage source 20 outputs the mode control signal MODE at a predetermined level (low level). The linear regulator 30 switches the regulation mode and the bypass mode based on the mode control signal MODE outputted from the reference voltage source 20. As a result, before the reference voltage Vref reaches a predetermined value (1.2V), the linear regulator 30 can output the battery voltage Vbat as it is, in bypass mode, and after reaching the predetermined voltage value Vpd, can transition to the regulation mode, and stabilize the battery voltage Vbat, based on the stabilized reference voltage Vref.

The abovementioned embodiments are examples, and a person skilled in the art will understand that various modified examples in combinations of various component elements and various processes thereof are possible, and that such modified examples are within the scope of the present invention.

In the embodiment, an explanation has been given of cases in which the reference voltage source 20 and the linear regulator 30 are applied to the power supply apparatus provided with a step-up switching regulator that uses a transformer, but there is no limitation thereto. For example, the switching regulator may be a non-insulating type using an inductor, or may be a step-down/step-up type, or a step-down type. Furthermore, in place of the switching regulator, a switching power supply, such as a charge pump circuit or the like, may be used.

In the embodiment, the configuration of the linear regulator 30 explained using FIG. 3 is merely an example, and various types of linear regulator can be used. In FIG. 3, the switch SW1 is arranged between the gate of the transistor Tr2 and ground, and by turning the transistor Tr2 fully ON, the bypass mode is realized; however, there is no limitation thereto, and if there is a switching circuit which turns the transistor Tr2 fully ON, other forms of circuit may be used. Moreover, in FIG. 3, a configuration is used in which, in the bypass mode, the transistor Tr2 itself is turned fully ON and the battery voltage Vbat, which is the input voltage, is outputted as it is; however, there is no limitation thereto, and the transistor for a bypass that is fully ON, in the bypass mode, may be arranged in parallel to the transistor Tr2.

In addition, the configuration of the reference voltage source 20 explained using FIG. 4 is merely one example, and it is possible to use a constant voltage source of various forms of bandgap regulator circuit and the like.

In the embodiment, an explanation was given of cases in which the mode control signal MODE, which switches the regulation mode and the bypass mode of the linear regulator 30, is generated in the reference voltage source 20, but there is no limitation thereto. The mode control signal MODE may be separately generated in another circuit block.

In the embodiment, an explanation was given concerning cases in which the control circuit 110 is integrated on one semiconductor substrate, but there is no limitation thereto; a portion thereof may be configured using a discrete component or a chip part, or a configuration may be integrated on a plurality of semiconductor substrates. These circuit configurations may be appropriately designed in accordance with a specification required for a circuit.

With regard to the transistors used in the embodiment, the bipolar transistor and the MOSFET can clearly be substituted, and furthermore, the NPN types and PNP types, or the N-channel and the P-channel types can also be substituted.

The present invention, outside of the power supply apparatus explained in the embodiment, can be used in various types of semiconductor devices provided with the reference voltage source 20 and the linear regulator 30. In these cases, the present invention may be understood as the following embodiment. That is, in this embodiment, the semiconductor device is provided with a reference voltage source which generates a predetermined reference voltage, and a linear regulator which stabilizes an input voltage Vin, based on the reference voltage generated by the reference voltage source. In addition, an output voltage of the linear regulator is supplied as a power supply voltage of the reference voltage source.

Also in this embodiment, similar to what was explained using the abovementioned embodiment, it is possible to generate the reference voltage in which a noise component is reduced. For example, it is possible to preferably use the semiconductor device of the embodiment in a circuit in which noise is generated, and, for example, a motor drive circuit or the like may be cited.

While the preferred embodiments of the present invention have been described using specific terms, such description is for illustrative purposes only, and it is to be understood that changes and variations may be made without departing from the spirit or scope of the appended claims.

The invention claimed is:

1. A power supply apparatus for use with an input voltage provided from outside, the power supply apparatus comprising:
    a switching power supply which stabilizes the input voltage;
    a reference voltage source which generates a predetermined reference voltage; and
    a linear regulator which stabilizes the input voltage, based on the reference voltage generated by the reference voltage source; wherein
    an output voltage of the linear regulator is supplied as a power supply voltage of a controller of the switching power supply and the reference voltage source, and the input voltage is not directly supplied to the controller as a power supply voltage.

2. A power supply apparatus according to claim 1, wherein the linear regulator is configured to enable switching of a regulation mode in which a voltage is outputted according to the reference voltage, and a bypass mode in which the input voltage is outputted as it is, with no relation to the reference voltage, and when the power supply apparatus is started up, the linear regulator operates in the bypass mode, during a time period until the reference voltage reaches a predetermined voltage value, and when the reference voltage exceeds the predetermined voltage value, operates in the regulation mode.

3. A power supply apparatus according to claim 2, wherein the linear regulator comprises:

an operational amplifier to which are inputted the reference voltage and a feedback voltage corresponding to the output voltage of the linear regulator;

a transistor in which an error voltage outputted from the operational amplifier is inputted to a control terminal, and the input voltage is applied to an end, and which outputs the output voltage from another end; and a switch circuit which changes electrical potential of a control terminal of the transistor, in the bypass mode, and forcibly turns the transistor ON.

4. A power supply apparatus according to claim 3, wherein the switch circuit includes a switch arranged between a terminal with a fixed electrical potential and the control terminal of the transistor, which is ON in the bypass mode.

5. A power supply apparatus according to claim 2, wherein, when the reference voltage generated by the reference voltage source reaches a predetermined voltage value, the reference voltage source outputs a mode control signal of a predetermined level, and when the mode control signal outputted from the reference voltage source becomes the predetermined level, the linear regulator transitions to the regulation mode.

6. A power supply apparatus according to claim 5, wherein the reference voltage source comprises:

a first transistor of PNP type connected at one end to a terminal where the reference voltage is generated and turned on when the reference reaches a predetermined voltage;

a second transistor provided between the other end of the first transistor and a ground terminal of the first transistor;

a third transistor connected to the second transistor so as to form a current mirror circuit and generating a current according to a current flowing in the second transistor; and a resistor provided on a current path of a current flowing in the third transistor and connected at one end to a terminal where the input voltage is applied, wherein a signal generated at the other end of the resistor is output as the mode control signal.

7. A power supply apparatus according to claim 1, wherein the reference voltage source, the linear regulator, and the controller of the switching power supply are integrated on one semiconductor substrate.

8. A power supply apparatus according to claim 1, wherein the switching power supply is a step-up switching regulator which steps up the input voltage.

9. An electronic device comprising:
a battery;
a load circuit; and
the power supply apparatus according to claim 8, which has voltage of the battery as an input voltage, and steps up the voltage to supply the load circuit.

10. An electronic device according to claim 9, further comprising an imaging unit, wherein the load circuit includes a xenon tube which operates as a flash when an image is taken by the imaging unit.

11. A semiconductor device comprising:

a reference voltage source which generates a predetermined reference voltage; and a linear regulator which stabilizes an input voltage, based on the reference voltage generated by the reference voltage source; wherein the semiconductor device supplies an output voltage of the linear regulator as a power supply voltage of the reference voltage source, the linear regulator is configured to enable switching of a regulation mode in which a voltage is outputted according to the reference voltage, and a bypass mode in which the input voltage is outputted as it is, with no relation to the reference voltage, when the semiconductor device is started up, the linear regulator operates in the bypass mode, during a time period until the reference voltage reaches a predetermined voltage, and when the reference voltage exceeds the predetermined voltage, operates in the regulation mode, the reference voltage source outputs a mode control signal of a predetermined level when the generated reference voltage source reaches a predetermined voltage value, and the linear regulator makes transition to the regulation mode when the mode control signal output from the reference voltage source reaches the predetermined level, where the reference voltage source comprises:

a first transistor connected at one end to a terminal where the reference voltage is generated;

a second transistor provided between the other end of the first transistor and a ground terminal of the first transistor;

a third transistor connected to the second transistor so as to form a current mirror circuit and generating a current according to a current flowing in the second transistor; and a resistor provided on a current path of a current flowing in the third transistor and connected at one end to a terminal where the input voltage is applied, wherein a signal generated at the other end of the resistor is output as the mode control signal.

* * * * *